United States Patent

Manico et al.

[11] Patent Number: 5,940,637
[45] Date of Patent: Aug. 17, 1999

[54] PHOTOGRAPHIC FILM CARTRIDGE CONTAINING TIME AND TEMPERATURE INTEGRATING INDICATOR DEVICE, AND PROCESS FOR CONTROLLING PHOTOFINISHING OF FILM

[75] Inventors: Joseph A. Manico; Arunachalam T. Ram, both of Rochester; Paul W. Partridge, Penfield, all of N.Y.

[73] Assignee: Eastman Kodak Company, Rochester, N.Y.

[21] Appl. No.: 08/987,787

[22] Filed: Dec. 9, 1997

[51] Int. Cl.$^6$ .................................................. G03B 17/26
[52] U.S. Cl. .......................... 396/207; 396/284; 396/512; 396/578
[58] Field of Search ................................. 396/207, 209, 396/284, 578, 512, 511, 290

[56] References Cited

U.S. PATENT DOCUMENTS

| | | |
|---|---|---|
| 3,344,670 | 10/1967 | Olsen et al. . |
| 3,625,126 | 12/1971 | Land ........................................ 396/284 |
| 3,999,946 | 12/1976 | Patel et al. . |
| 4,382,700 | 5/1983 | Youngren . |
| 4,384,780 | 5/1983 | Bresson . |
| 4,469,423 | 9/1984 | Bresson . |
| 4,735,745 | 4/1988 | Preziosi et al. . |
| 4,737,463 | 4/1988 | Bhattacharjee et al. . |
| 4,812,053 | 3/1989 | Bhattacharjee . |
| 4,892,677 | 1/1990 | Preziosi et al. . |
| 4,917,503 | 4/1990 | Bhattacharjee . |
| 5,057,434 | 10/1991 | Prusik et al. . |
| 5,085,801 | 2/1992 | Thierry et al. . |
| 5,109,241 | 4/1992 | Keeney .................................... 396/207 |
| 5,120,137 | 6/1992 | Ou-Yang . |
| 5,285,227 | 2/1994 | Lawther et al. . |
| 5,306,466 | 4/1994 | Goldsmith . |
| 5,499,597 | 3/1996 | Kronberg . |
| 5,659,834 | 8/1997 | Keirsbilck et al. ..................... 396/284 |
| 5,667,303 | 9/1997 | Arens et al. . |
| 5,761,558 | 6/1998 | Patton et al. ........................... 396/512 |

FOREIGN PATENT DOCUMENTS

96/28714  3/1996  WIPO .

OTHER PUBLICATIONS

"3M Monitor Mark™ Product Exposure Indicators" Technical Report, 1995.
"3M Monitor Mark™ High Temperature Labels" Data Page for High Temperature Labels 34AA and 42AA, 1995.
"Telatemp Custom Temperature Labels" and "Telatemp Irreversible Temperature Labels" data sheets.

Primary Examiner—W. B. Perkey
Attorney, Agent, or Firm—Andrew J. Anderson

[57] ABSTRACT

A photographic film cartridge is disclosed comprising a housing with an outer surface, and a time and temperature integrating device for providing a visually observable indication of cumulative thermal exposure on the outer surface, wherein the time and temperature integrating device is thin enough so as to not interfere with performance of the cartridge in a photographic camera and comprises a thermally sensitive image-forming area and indicating indicia in association with the image-forming area for indicating when the film cartridge has been exposed to a predetermined cumulative thermal exposure. In accordance with a second embodiment of the invention, a process for controlling the photofinishing of film contained in a photographic film cartridge comprising a housing with an outer surface, and a time and temperature integrating device for providing an indication of cumulative thermal exposure on the outer surface is disclosed, said process comprising determining from the time and temperature integrating device whether the film has been exposed beyond a maximum level of cumulative thermal exposure, and rejecting the film for photofinishing if the thermal exposure level is beyond the maximum level.

16 Claims, 4 Drawing Sheets

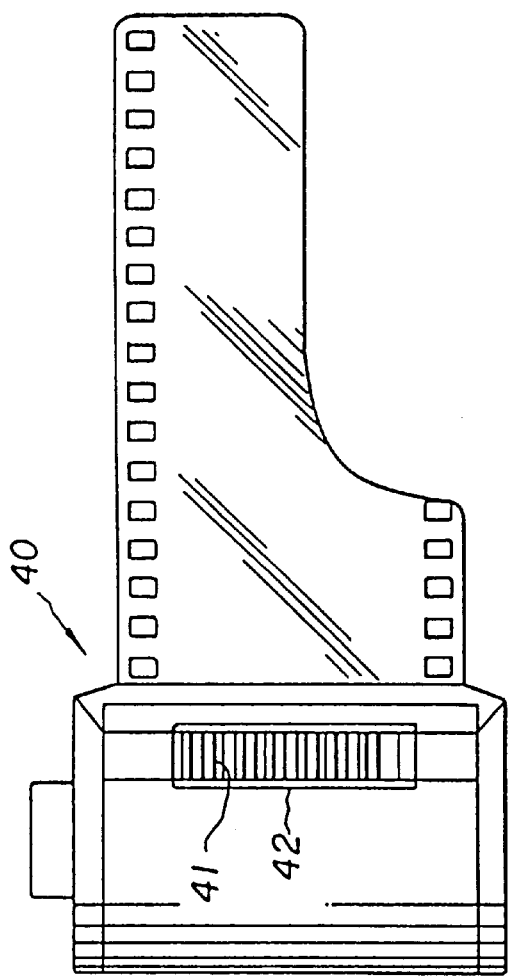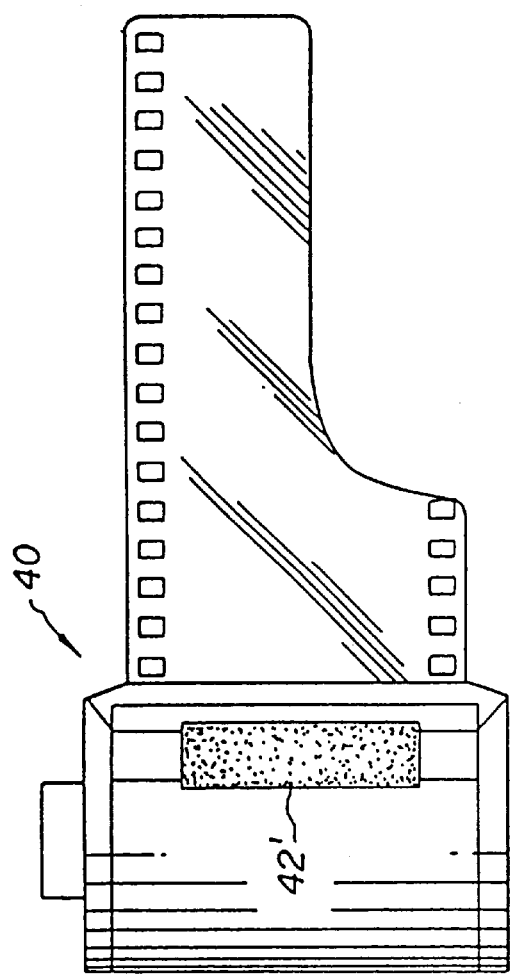

5,940,637

PHOTOGRAPHIC FILM CARTRIDGE CONTAINING TIME AND TEMPERATURE INTEGRATING INDICATOR DEVICE, AND PROCESS FOR CONTROLLING PHOTOFINISHING OF FILM

FIELD OF THE INVENTION

This invention relates in general to photographic film cartridges containing time and temperature integrating indicator devices, and process for controlling photofinishing of film contained in such cartridges. In particular, this invention relates to the use of very thin indicator devices on photographic film cartridges, and the use of cumulative thermal exposure information in the control of the photofinishing process.

BACKGROUND OF THE INVENTION

It is frequently desirable to be able to provide an indication whether a product has been exposed to an undesirable time-temperature history which results in substantial degradation of the product, or to a correct time-temperature history which may be required during processing or use of the product. This applies, e.g., to perishables such as foods, pharmaceuticals, and photographic products, which generally have limited useful lifespans which may be significantly shortened by exposure to undesirably relative high temperatures for a specific time period during storage, distribution, or use. This also applies, e.g., to certain products such as canned goods and biomedical materials which may be required to be held at certain high temperatures for a specific time period, e.g. to guarantee sterilization.

The rate of degradation, or other change in a product, at a given temperature is typically product dependent, i.e. some types of products show a greater increase in the rate of change for a given temperature increase relative to other products. Accordingly, it would be desirable to be able to provide indicators for use with various products which supply a visual indication of cumulative thermal exposure in which the rate of providing the visual indication of cumulative thermal exposure can be approximately matched to the rate of cumulative change, such as degradation, of the specific product to be monitored.

For silver halide based photographic film products, the thermal exposure history may be particularly important in determining optimum photofinishing requirements necessary to provide best possible images from such film products, as the performance of such materials may be impacted by various levels of thermal exposures after manufacturing which may be encountered during distribution and sale of such materials, after purchase but prior to use, during use, as well as after use and prior to photographic processing. The customary packaging and distribution techniques and typical methods of use of such materials makes monitoring the thermal exposure history of a particular photographic material unit for the entire period of from after manufacture up to ultimate photographic processing a challenge.

A number of systems have been described for providing indicators useful in detecting whether a product has been exposed either to specific time-temperature combinations or simply to a particular temperature which results in substantial degradation. Representative systems are disclosed, e.g., in U.S. Pat. No. 3,999,946 (use of compositions containing at least two conjugated acetylene groups which exhibit sequences of irreversible color changes at combinations of times and temperatures specific to each composition) and WO 96/28714 (use of viscoelastic material which migrates into a diffusely light-reflective porous matrix at a rate which varies with temperature to progressively change the light transmissivity of the porous matrix). A drawback of many of the indicators described in the prior art, however, is that they may frequently be useful only over a very limited temperature range, that they may not be easily designed to match the rate of cumulative change desired to be monitored for a particular product, that they may be bulky or expensive, that they may require cumbersome manual activation steps, or that they may depend upon diffusion or complex reaction mechanisms for their operation. Additionally, the prior art has not suggested a way to effectively monitor the thermal exposure history of photographic films contained in cartridges for the entire period from after manufacturing up to ultimate photographic processing.

PROBLEM TO BE SOLVED BY THE INVENTION

It would be desirable to provide time and temperature integrating devices which may be used in conjunction with conventional photographic film cartridges in a manner which did not interfere with performance of the cartridge in a photographic camera. Additionally, it would be desirable to use the response from a time and temperature integrating device to control photofinishing operations for films contained in such cartridges. It would be especially desirable to provide indicators for photographic film cartridges which can be easily optimized to match various rates of time-temperature dependent cumulative changes desired to be monitored for various film products.

SUMMARY OF THE INVENTION

In accordance with one embodiment of the invention, a photographic film cartridge is disclosed comprising a housing with an outer surface, and a time and temperature integrating device for providing a visually observable indication of cumulative thermal exposure on the outer surface, wherein the time and temperature integrating device is thin enough so as to not interfere with performance of the cartridge in a photographic camera and comprises a thermally sensitive image-forming area and indicating indicia in association with the image-forming area for indicating when the film cartridge has been exposed to a predetermined cumulative thermal exposure.

In accordance with a second embodiment of the invention, a process for controlling the photofinishing of film contained in a photographic film cartridge comprising a housing with an outer surface, and a time and temperature integrating device for providing an indication of cumulative thermal exposure on the outer surface is disclosed, said process comprising determining from the time and temperature integrating device whether the film has been exposed beyond a maximum level of cumulative thermal exposure, and rejecting the film for photofinishing if the thermal exposure level is beyond the maximum level.

In accordance with preferred embodiments of the invention, the time and temperature integrating device for providing an indication of cumulative thermal exposure for use in the cartridge and process of the invention has a total thickness of less than 300 micrometers, and comprises (a) a substrate having thereon a thermally sensitive image-forming area comprising a combination of (i) an organic silver salt oxidizing agent and (ii) a reducing agent for the organic silver salt oxidizing agent, and (b) indicating indicia in association with the image forming area for indicating when the device has been exposed to a predetermined cumulative thermal exposure.

BRIEF DESCRIPTION OF THE DRAWINGS

FIGS. 2a and 2b illustrate the use of an indicator device in association with a bar code label of a photographic film cartridge.

DESCRIPTION OF THE PREFERRED EMBODIMENTS

Figure 1A:
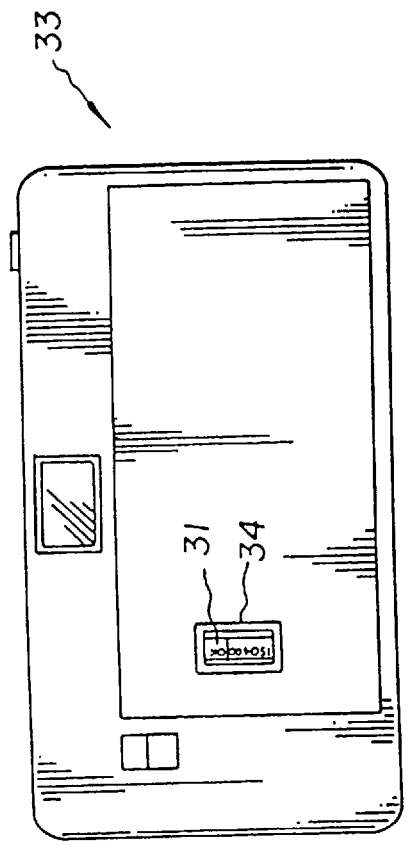
FIGS. 1a and 1c illustrate an indicator device on a film cartridge.
Figure 1C:
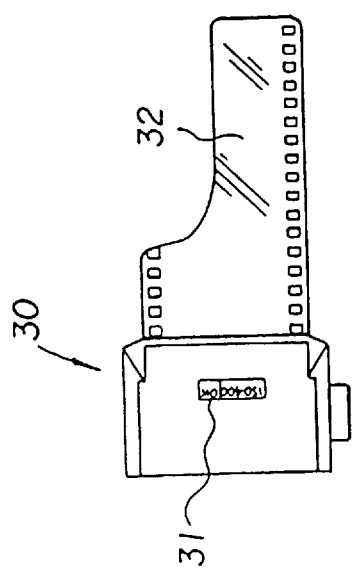
Figure 1B:
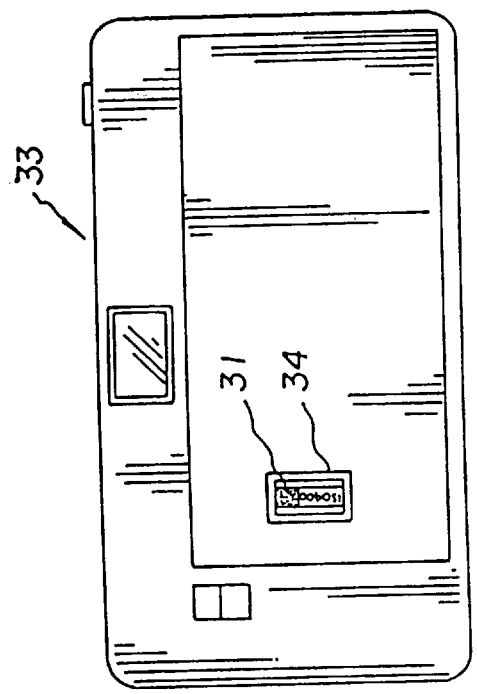
FIGS. 1b and 1d illustrate an indicator device visible through a "film type" window on a photographic camera back.
Figure 1D:
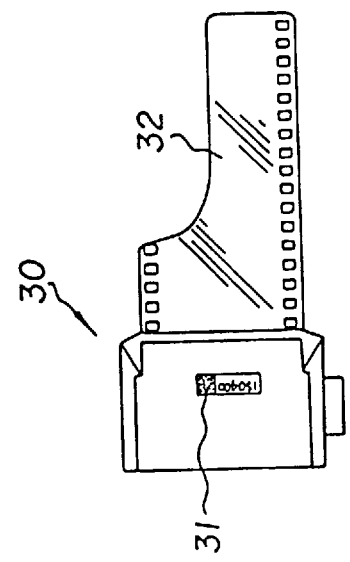

In one specific preferred embodiment, a thin film type time and temperature integrating indicator device is included on a photographic film cartridge to provide an indication of the cumulative thermal exposure to which a silver halide based photographic material has been subjected. Such photographic material may be, e.g., color negative, color positive, color reversal or black and white films. A thin indicator device in accordance with the invention may be conveniently applied to a conventional film cassette or cartridge, such as a 35 mm or an Advanced Photo System film cartridge. As illustrated in FIGS. 1a–1d, in order for an indicator 31 to be visible when in use (e.g., when film 32 has been loaded in a photographic camera 33), it may b e positioned on the outer surface of the housing of film cartridge 30 so as to be aligned with camera 33 "film type" window 34 typically provided on camera backs. As shown therein, indicating indicia in association with indicator device 31 provided on cartridge 30 such as "OK" as illustrated in FIGS. 1a and 1b may be simply obscured once the film in the cartridge has been exposed to an undesirable cumulative thermal exposure as illustrated in FIGS. 1c and 1d. It is a requirement of the invention that the cumulative time and temperature exposure indicators be sufficiently thin so as to be able to be positioned directly on the film cartridge housing, without interfering with the normal operations of the film cartridge in a photographic camera. Indicators provided in thin film type formats having a total thickness of less than 500 micrometers, e.g., is generally preferred for such purpose, more preferably less than 300 micrometers and most preferably less than 150 micrometers.

In another specific embodiment of the invention, a time and temperature indicator comprising a heat sensitive composition may be used in association with indicating indicia in the form of a bar code label of typically provided on a film cartridge housing, such that excessive thermal exposure results in obscuring the bar code so as to render it unreadable by a bar code reader. Such obscured bar code reader may then function to provide an indication that the object to which the indicator device is attached has been heat damaged and should be replaced prior to purchase or use. As illustrated in FIGS. 2a and 2b, in accordance with a particularly preferred embodiment, an overlay layer 42 comprising a heat sensitive composition may be used in association with the bar code label 41 of a photographic film cartridge 40. The film cartridge may automatically communicate to a photofinisher if heat induced film damage had occurred. Film processing pre-splicer equipment, e.g., typically is designed to read the bar code on a film cartridge to determine the film type and record this information for use by other photofinishing equipment such as photographic printers. If the bar code 41 were obscured by a deployed (e.g., darkened) cumulative heat indicator 42' as illustrated in FIG. 2b, the pre-splicer could be programmed to reject the film cartridge. The heat damaged film contained in the rejected cartridge could then be sent for special photofinishing to compensate for the heat damaged condition. Such special photofinishing, e.g., may include digital optical scanning and printing procedures. Alternatively, a cumulative heat indicator may be used to provide information as to the level of heat a particular film unit has been exposed, and the photofinishing operation may be controlled to optimize photofinishing for the particular film unit in response to such data.

The thermally sensitive image-forming area of the time and temperature integrating indicators used with photographic film cartridges in accordance with the invention may comprise any composition previously suggested for use in time and temperature integrating devices. Such compositions may exhibit density and/or color changes as previously described in the art. Preferably, the thermally sensitive image-forming area comprises a thermally sensitive composition which may be coated in a thin layer on a substrate, or absorbed into a substrate, such as, e.g., the acetylenic compound compositions described in U.S. Pat. No. 3,999, 946. Most preferably, the thermally sensitive image-forming area comprise a combination of (i) an organic silver salt oxidizing agent and (ii) a reducing agent for the organic silver salt oxidizing agent, as described in co-pending, commonly assigned, concurrently filed U.S. patent application Ser. No. 08/987,662 (Kodak Docket No. 76870AJA), the disclosure of which is incorporated by reference herein. Such compositions comprising materials typically used in thermographic and photothermographic imaging elements have been found to be particularly suitable for use in the instant invention as they may be designed to provide various differing rates of time-temperature dependent cumulative changes which may be desired to be monitored for various photographic films, and as they can be easily and inexpensively manufactured in a thin film format so as to be capable of being applied to a photographic film cartridge without interfering with operation of the cartridge in a photographic camera.

Figure 3:
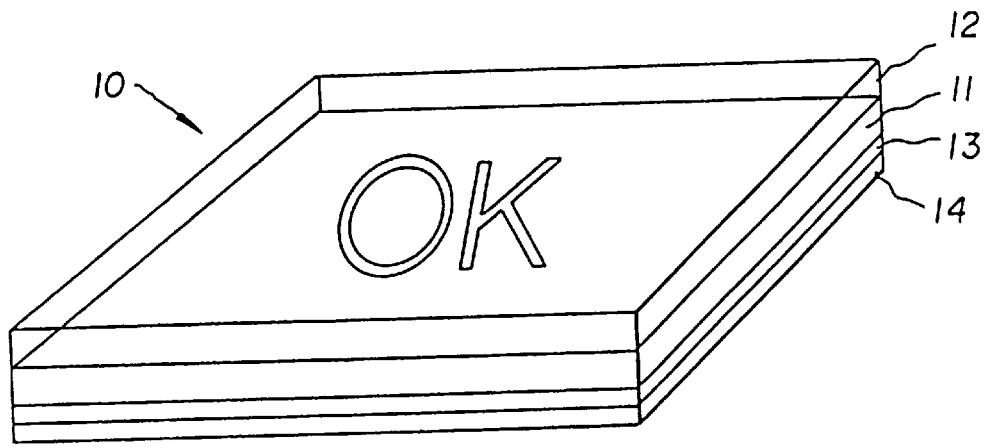
FIG. 3 illustrates a time and temperature integrating indicator device in accordance with one embodiment of the invention.
Figure 4A:
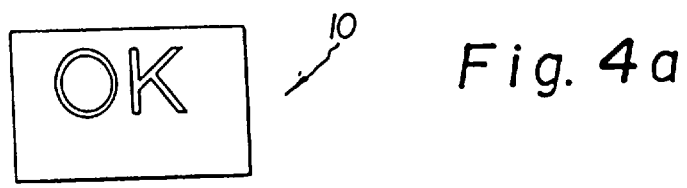
FIG. 4a represents an indicator device in "fresh" state, having been exposed to no "high temperature" exposure.
Figure 4B:
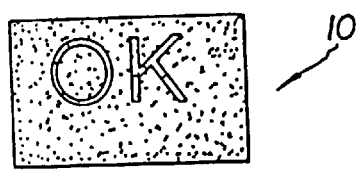
FIGS. 4b–4d represent the same device upon "high temperature" exposures for progressively extended periods of time.
Figure 4C:
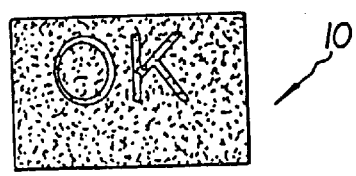
Figure 4D:
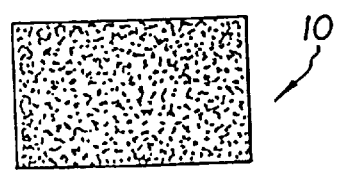

Indicating indicia for use with time and temperature integrating devices used in accordance with the invention may comprise letters or graphics printed on the device which become obscured by an image formed by the thermally sensitive composition when the device has been exposed to a sufficient cumulative thermal exposure. In accordance with one embodiment, a time and temperature integrating indicator device 10 may be created by coating a support 11 printed with indicia such as "GOOD", "FRESH", or "OK" with a transparent thermally sensitive composition layer 12 as indicated in FIG. 3. In accordance with such embodiment, as the device is exposed to sufficiently high temperatures over sufficient periods of time, the thermally sensitive composition begins to darken, obscuring the indicia as illustrated in FIGS. 4a–4d. FIG. 4a represents a device in "fresh" state, having been exposed to no "high temperature" exposure, while FIGS. 4b–4d represent the same device upon "high temperature" exposures for progressively extended periods of time. The change in visual density may be correlated to known time and temperature integrated exposures, thus providing an indication of the time and temperature history of film in a cartridge to which the device has been attached. Alternatively, the thermally sensitive composition may be coated on a transparent support, and the device directly overlaid and attached to film cartridge housing surface with printed indicia. The thermally sensitive composition may alternatively itself be imagewise printed on a support to form latent indicia, which becomes visible, or changes color or density level, only upon sufficient thermal exposure to form a message such as "NO GOOD" or "HEAT DAMAGED". In accordance with a further embodiment of the invention, the change in color or density level in a time and temperature indicating device used in accordance with the invention may be correlated to indicia in the form of reference colors and/or density levels associated with predetermined levels of thermal exposure. In another embodiment, a time and temperature indicator comprising a heat sensitive composition may be used in association with indicating indicia in the form of a bar code as discussed above.

The time and temperature integrating devices in accordance with the invention can comprise a variety of supports on which the thermally sensitive composition may be coated. Examples of useful supports include opaque or transparent poly(vinylacetal) film, polystyrene film, poly (ethyleneterephthalate) film, poly(ethylene naphthalate) film, polycarbonate film, and related films and resinous materials, as well as paper, glass, metal, and other supports that withstand the intended thermal exposure temperature ranges desired to be monitored for a particular product and are sufficiently thin for use directly on a photographic film cartridge. The use of opaque or reflective supports may be advantageous in that even very slight density and/or color changes in the thermally sensitive compositions used in an indicator in accordance with the invention may be more easily noticed. Even density changes as small as 0.05 units, e.g., may be sufficient to demonstrate a visually noticeable change with a reflective support.

Adhesive backing layers or overcoats may be used for attaching a time and temperature integrating device to an photographic film cartridge in accordance with the invention. Conventional adhesive techniques may be used, including those typically used in the label and decalcomania arts. The use of a pressure-sensitive adhesive layer 13 with an associated release layer 14 as illustrated in FIG. 3, is particularly applicable, as such materials are capable of exerting a strong adhesive force toward a variety of surfaces without requiring activation by heat. Pressure-sensitive adhesives include, e.g., polyesters, natural rubber, styrene butadiene rubber, polyisobutylene, ethylene-vinyl acetate copolymers, acrylics, vinyl acetate copolymers, silicone polymers, poly(vinyl alkyl ethers), and other materials, as described, e.g., in "Encyclopedia of Polymer Science and Engineering", vol 13, pg 345–368 and vol 8, pg 617–646, John Wiley & Sons, New York (1985), and Kir-Othmer "Encyclopedia of Chemical Technology", Jacqueline I. Kirschwitz (Editor), Vol 1, pg 459–461, John Wiley & Sons, NY (1991). The indicator devices may be provided with a release sheet over the pressure sensitive adhesive as is typical in the label and decal art, which may be removed prior to attaching the device to the film cartridge housing.

The time and temperature integrating devices used in accordance with preferred embodiments of the invention comprise a support having thereon a thermally sensitive image-forming area composition comprising a combination of (i) an organic silver salt oxidizing agent and (ii) a reducing agent for the organic silver salt oxidizing agent. Such compositions may comprise components of thermally sensitive compositions typically used in conventional thermally processable imaging elements. Such imaging elements, including films and papers, for producing images by thermal processing are well known. These elements include thermographic elements in which an image is formed by imagewise heating the element, as well as photothermographic elements in which an image is formed by imagewise exposure of the element to light followed by development by uniformly heating the element. Such imaging elements are described in, for example, Research Disclosure, June 1978, Item No. 17029 and U.S. Pat. Nos. 3,080,254, 3,457,075 and 3,933,508. Research Disclosure is published by Kenneth Mason Publications, Ltd., Dudley House, 12 North St., Emsworth, Hampshire P010 7DQ, England. The thermographic and photothermographic elements typically comprise essentially transparent thermally sensitive silver salt compositions coated on a support, which compositions form a visible image of increasing density with increasing thermal exposure.

While the thermal sensitivity of thermographic and photothermographic compositions is well known, it has not been previously suggested to use such compositions in association with indicating indicia in a time and temperature integrating indicator device for use with conventional silver halide based photographic imaging films. To the contrary, photothermographic imaging elements are typically heated at relatively high temperatures for relatively short periods of time to reach maximum density after an imagewise exposure (e.g., temperature within the range of about 90° C. to 180° C. for about 0.5 to about 60 seconds). At lower temperatures, the time required for complete image development may be extended for weeks or months or even longer, depending upon the reactivity of the thermographic or photothermographic composition. The use of thermographic and photothermographic formulations as the thermally sensitive composition of the time and temperature integrating devices in accordance with preferred embodiments of the instant invention takes advantage of the ability to control the reactivity of such formulations in order to correlate such reactivity to the known time and temperature sensitivity of a particular silver halide based photographic film. Such compositions may be formulated to demonstrate a range of visible density increases corresponding to relatively longer periods of exposures at relatively lower temperatures than previously used for development in a conventional thermographic or photothermographic imaging element.

In accordance with preferred embodiments of the invention, thermally sensitive thermographic and photothermographic compositions may be designed to exhibit specific density changes corresponding to specific time and temperature integrated exposures correlated to the specific sensitivities of a particular photographic film product. Such preferred indicator devices are particularly suitable for use with silver halide based light sensitive photographic films, which typically demonstrate undesirable degradation upon time and temperature integrated exposures within ranges which correlate well to the time and temperature image development requirements for thermographic and photothermographic compositions.

The thermally sensitive composition used in the time and temperature integrating devices in accordance with preferred embodiments of the invention comprises an oxidation-reduction image forming combination that contains an organic silver salt oxidizing agent, preferably a silver salt of a long chain fatty acid. Such organic silver salts themselves are resistant to darkening upon illumination. Preferred organic silver salt oxidizing agents are silver salts of long chain fatty acids containing 10 to 30 carbon atoms. Examples of useful organic silver salt oxidizing agents are silver behenate, silver stearate, silver oleate, silver laurate, silver hydroxystearate, silver caprate, silver myristate, and silver palmitate. Combinations of organic silver salt oxidizing agents are also useful. Examples of useful organic silver salt oxidizing agents that are not organic silver salts of fatty acids are silver benzoate and silver benzotriazole.

A variety of reducing agents are useful in the thermally sensitive composition. Examples of useful reducing agents include substituted phenols and naphthols, such as bis-beta-naphthols; polyhydroxybenzenes, such as hydroquinones, pyrogallols and catechols; aminophenols, such as 2,4-diaminophenols and methylaminophenols; ascorbic acid reducascorbic acid, ascorbascorbic acid, ascorbic acid ketals and other ascorbic acid derivatives; hydroxylamine reducing agents; 3-pyrazolidone reducing agents, such as 1-phenyl-3-pyrazolidone and 4-methyl-4-hydroxymethyl-1-phenyl-3-pyrazolidone; and sulfonamidophenols and other organic reducing agents known to be useful in thermographic and photothermographic elements, such as described in U.S. Pat. No. 3,933,508, U.S. Pat. No. 3,801,321 and Research Disclosure, June 1978, Item No. 17029. Combinations of organic reducing agents are also useful in the thermally sensitive composition.

Preferred organic reducing agents are sulfonamidophenol reducing agents, such as described in U.S. Pat. No. 3,801,321. Examples of useful sulfonamidophenol reducing agents are 2,6-dichloro-4-benzene-sulfonamidophenol; benzene-sulfonamidophenol; and 2,6-dibromo-4-benzenesulfonamidophenol, and combinations thereof.

In accordance with a preferred embodiment of the invention, the thermally sensitive image-forming area of the time and temperature integrating devices comprises at least one layer containing in reactive association in a binder, preferably a binder comprising hydroxyl groups, a light-sensitive photographic silver halide prepared in situ and/or ex situ in combination with the organic silver salt oxidizing agent and the reducing agent for the organic silver salt oxidizing agent. Such image-forming compositions are typically used in photothermographic imaging elements as described in the above cited thermographic imaging element references. References describing such components in the context of photothermographic imaging elements include, for example, U.S. Pat. Nos. 3,457,075; 4,459,350; 4,264,725 and 4,741,992 and Research Disclosure, June 1978, Item No. 17029.

In photothermographic materials it is believed that the latent image silver from the silver halide acts as a catalyst for the described imageforming combination upon thermal exposure. Photosensitive silver salts may be included to activate or optimize the thermal sensitivity of a time and temperature integrating device used in accordance with the invention to a particular temperature range for a given application. In one particular embodiment of the invention, a photosensitive silver salt may be used to activate the time and temperature integrating device upon exposure to light. In such embodiment, the thermally sensitive composition of the device may be maintained in a light-tight environment, e.g. through use of a removable opaque overcoat layer, until the device is desired to be activated, at which point the device would be exposed to light to fog the photosensitive silver salts and thereby activate the device.

In the case of the time and temperature integrating devices which comprise photothermographic compositions which are activated by exposure to light, forms of energy to which the photographic silver halides may be sensitive include ultraviolet, visible and infrared regions of the electromagnetic spectrum as well as electron beam and beta radiation, gamma ray, x-ray, alpha particle, neutron radiation and other forms of corpuscular wave-like radiant energy in either noncoherent (random phase) or coherent (in phase) forms produced by lasers. Exposures may be monochromatic, orthochromatic, or panchromatic depending upon the spectral sensitization of the photographic silver halide. Exposure is preferably for a time and intensity sufficient to fog the composition by producing a developable latent image in the photosensitive silver salts. Spectral sesitizing dyes may be used to provide sensitivity to a particular region of the elecomagnetic spectrum, but in general are not necessary for use in thermally sensitive photothermographic compositions which may be used in accordance with the devices of the invention.

A preferred concentration of photographic silver halide for use in the thermally sensitive areas of the time and temperature integrating devices in accordance with preferred embodiments of the invention is within the range of 0.01 to 10 moles of photographic silver halide per mole of organic silver salt oxidizing agent (e.g., silver behenate) in the photothermographic material. Other photosensitive silver salts are useful in combination with the photographic silver halide if desired. Preferred photographic silver halides are silver chloride, silver bromide, silver bromochloride, silver bromoiodide, silver chlorobromoiodide, and mixtures of these silver halides. Very fine grain photographic silver halide is especially useful. The photographic silver halide can be prepared by any of the known procedures in the photographic art Such procedures for forming photographic silver halides and forms of photographic silver halides are described in, for example, Research Disclosure, December 1978, Item No. 17029 and Research Disclosure, June 1978, Item No. 17643. Tabular grain photosensitive silver halide is also useful, as described in, for example, U.S. Pat. No. 4,435,499. The photographic silver halide can be unwashed or washed, chemically sensitized, protected against the formation of fog, and stabilized against the loss of sensitivity during keeping as described in the above Research Disclosure publications. The silver halides can be prepared in situ as described in, for example, U.S. Pat. No. 4,457,075, or prepared ex situ by methods known in the photographic art.

In accordance with the invention, the thermally sensitive compositions are designed to show progressive, predetermined changes in visual image density corresponding to increased integrated time and temperature exposures. The optimum concentrations of the organic silver salt oxidizing agent and of the reducing agent in the thermally sensitive composition will vary depending upon the desired image density, particular organic silver salt oxidizing agent, particular reducing agent and particular time-temperature sensitivity desired to be achieved. Total silver metal coverages of from about 0.1 to 10 g/m$^2$ may typically be used in the thermally sensitive image forming compositions used in the indicator devices of the invention, but coverages of at least about 1.0 g/m$^2$, and more preferably at least about 2.0 g/m$^2$, are desirable to form images with preferably high densities for the indicator devices of the invention. In general, such components will desirably be present at higher levels than traditionally employed for conventional thermally processed imaging elements, as coverages of less than 2.0 g/m² total silver are typiclly used in conventional thermographic and photothermogaphic imaging elements in order to prevent excessive non-image fogging.

The thermally sensitive areas of the time and temperature integrating devices as described preferably contain various colloids and polymers alone or in combination as vehicles and binders and in various layers. Useful materials are hydrophilic or hydrophobic. They are transparent or translucent and include both naturally occurring substances, such as gelatin, gelatin derivatives, cellulose derivatives, polysaccharides, such as dextran, gum arabic and the like; and synthetic polymeric substances, such as water-soluble polyvinyl compounds like poly(vinyl alcohols), poly (vinylpyrrolidone) and acrylamide polymers. Other synthetic polymeric compounds that are useful include dispersed vinyl compounds such as in latex form and particularly those that increase dimensional stability of photographic elements. Effective polymers include water insoluble polymers of acrylates, such as alkylacrylates and methacrylates, acrylic acid, sulfoacrylates, and those that have cross-linking sites. Preferred high molecular weight materials and resins include poly(vinyl butyral), cellulose acetate butyrate, poly(methylmethacrylate), poly (vinylpyrrolidone), ethyl cellulose, polystyrene, poly (vinylchloride), chlorinated rubbers, polyisobutylene, butadiene-styrene copolymers, copolymers of vinyl chloride and vinyl acetate, copolymers of vinylidene chloride and vinyl acetate, poly(vinyl alcohol) and polycarbonates.

The thermally sensitive compositions as described can contain further addenda that are known to aid in formation of a useful image. Photothermographic and thermographic compositions, e.g., can contain development modifiers that function as speed increasing compounds, sensitizing dyes, hardeners, antistatic agents, plasticizers and lubricants, coating aids, brighteners, absorbing and filter dyes, such as described in Research Disclosure, December 1978, Item No. 17643 and Research Disclosure, June 1978, Item No. 17029. The components of the thermally sensitive composition can be in any location in the time and temperature integrating device that provides the desired visible density change. If desired, one or more of the components can be in one or more layers of the element. For example, in some cases, it is desirable to include certain percentages of the reducing agent, toner, stabilizer and/or other addenda in an overcoat layer over a photothermographic imaging layer of the element. This, in some cases, reduces migration of certain addenda in the layers of the element. It is necessary, however, that the components of the thermally sensitive imaging composition be "in association" with each other in order to produce the desired visible image density change. The term "in association" herein means that the components are in a location with respect to each other that enables the desired visible density change to be observed upon sufficient thermal exposure. The layers of the time and temperature integrating device may be coated on a support by coating procedures known in the photographic art, including dip coating, air knife coating, curtain coating or extrusion coating using hoppers. If desired, two or more layers may be coated simultaneously.

Photothermographic imaging elements of the prior art are typically manufactured to minimize fogging of the silver halide contained therein, while obtaining adequate photographic speed, so as to minimize non-imagewise density development. Time and temperature integrating devices used in accordance with the instant invention, on the other hand, will generally not be subject to such anti-fogging requirements. To the contrary, in accordance with particular embodiments of the invention, chemical sensitizing agents may be included to optimize photosensitivity of silver halide grains incorporated in the photothermographic compositions to optimize the catalytic effect of the silver halide grains on the thermal sensitivity of the composition, and complete fogging may be desired to activate the photothermographic composition to be thermally responsive to a particular temperature range. Thermal stabilizers may also be included, however, to optimize the response range of a thermally sensitive composition to a desired range for a particular application. Thermal stabilizers may also provide improved stability of the element during storage prior to use with a perishable product. Representative thermal stabilizers which may be used for such purposes include 2-bromo-2-arylsulfonylacetamides, such as 2-bromo-2-p-tolysulfonylacetamide; 2-(tribromomethyl sulfonyl) benzothiazole; and 6-substituted-2,4-bis(tribromomethyl)-s-triazines, such as 6-methyl or 6-phenyl-2,4-bis (tribromomethyl)-s-triazine.

In accordance with a particular embodiment, a photothermographic composition incorporating photosensitive silver halide grains which have been chemically sensitized with a gold sensitizer is used in the thermally sensitive areas of the time and temperature integrating devices of the invention, such as described, e.g., in copending, commonly assigned U.S. patent application Ser. No. 08/883,924 of Eshelman et al., filed Jun. 27, 1997, the disclosure of which is incorporated by reference herein. Such gold sensitized photothermographic compositions have been found to be more sensitive, and more easily fogged in the absence of antifogging agents, than conventional photothermographic compositions, and accordingly more applicable to use in accordance with the instant invention. Gold sensitizers may be effective at very low levels, e.g. as low as 0.1 mg/m², and levels of up to about 8.0 mg/m² are preferred to provide optimum sensitivity.

The thermally sensitive composition used in the indicator devices of the invention may also comprise a toning agent, also known as an activator-toner or toner-accelerator. Such materials may advantageously perform as development accelerators, and may be included at various levels to optimize desired responses for particular applications. Combinations of toning agents are also useful. Examples of useful toning agents and toning agent combinations are described in, for example, Research Disclosure, June 1978, Item No. 17029 and U.S. Pat. No. 4,123,282. Examples of useful toning agents include, for example, phthalimide, N-hydroxyphthalimide, N-potassium-phthalimide, succinimide, N-hydroxy-1,8-naphthalimide, phthalazine, 1-(2H)-phthalazinone and 2-acetylphthalazinone.

Post-processing image stabilizers and latent image keeping stabilizers are typically useful in photothermographic imaging elements. While generally not necessary for use in the instant invention, such materials may be used to control responses where desired for a particular application. Any of the stabilizers known in the photothermographic art may be useful for the described photothermographic elements. Illustrative examples of useful stabilizers include photolytically active stabilizers and stabilizer precursors as described in, for example, U.S. Pat. No. 4,459,350. Other examples of useful stabilizers include azole thioethers and blocked azolinethione stabilizer precursors and carbamoyl stabilizer precursors, such as described in U.S. Pat. No. 3,877,940.

While photothermographic imaging elements are typically heated at relatively high temperatures for relatively short periods of time after an imagewise exposure until a developed image is formed (e.g., temperature within the range of about 90° C. to 180° C. for about 0.5 to about 60 seconds), the use of thermally sensitive thermographic or photothermographic compositions in the time and temperature integrating devices used in accordance with preferred embodiments of the instant invention will typically be formulated to demonstrate ranges of visible density increases corresponding to relatively longer periods of exposures, and typically at relatively lower temperatures, such as for periods of minutes, hours, days, weeks, or even months at temperatures ranging from about −40° C. to about 160° C. Elements may also be formulated to exhibit density change responses outside this range if desired. It is an advantage of the invention that thermally sensitive compositions employed in accordance with the indicator devices of the invention may be conveniently designed to exhibit a density change profile corresponding to specific time and temperature integrated exposures desired to be monitored for a particular photographic film product.

A wide variety of materials can be used to prepare a backing layer that is compatible with elements comprising thermally sensitive compositions. The backing layer should not adversely affect sensitometric characteristics of the photothermographic element in accordance with certain embodiments of the invention such as minimum density, maximum density and photographic speed. Useful backing layers include those comprised of poly(silicic acid) and a watersoluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, acrylamide polymers, cellulose acetate, crosslinked polyvinyl alcohol, terpolymers of acrylonitrile, vinylidene chloride, and 2-(methacryloyloxy) ethyl-trimethylammonium methosulfate, crosslinked gelatin, polyesters and polyurethanes. Particularly preferred backing layers are described in above-mentioned U.S. Pat. Nos. 5,310,640 and 5,547,821, the entire disclosures of which are incorporated herein by reference. Backing layers are preferably transparent and may contain organic or inorganic matte particles. The matte particles are preferably beads of poly(methylmethacrylate-co-ethyleneglycoldimethacrylate) with a particle size of 3 to 5 micrometers at a coverage of 25 mg/m$^2$. An electroconductive layer may also be included, and may preferably comprise a colloidal gel of silver-doped vanadium pentoxide dispersed in a polymeric binder. An electroconductive backing layer may also be used comprising a polymeric binder, matte particles and electrically-conductive metal-containing particles dispersed in said binder in an amount sufficient to provide a surface resistivity of less than $5\times10^{11}$ ohms/square.

Time and temperature integrating devices used in accordance with the invention may include a protective layer coated over the thermally sensitive composition. Such an overcoat layer may perform several important functions, such as control of humidity of the thermally sensitive composition. The visible density change responses of thermographic and photothermographic compositions due to cumulative thermal exposure as described above are generally dependent upon the relative humidity to which such compositions are exposed. The humidity dependency of the device response may be eliminated by enclosing the thermally sensitive composition in a controlled humidity environment, such as through use of a water impermeable support and protective overcoat layer, or by enclosing the device in an otherwise sealed container. Advantageously, the relative humidity may be controlled to provide specific time and temperature density response curves optimized to match the known time and temperature exposure response of a specific product Alternatively, where humidity exposure is also a factor in the deterioration of a particular product which is desired to be monitored, cumulative time, temperature and humidity integrated exposures may be monitored with indicator devices where the thermally sensitive composition is left exposed to the relative humidity in which it is used.

Protective overcoats may be composed of hydrophilic colloids such as gelatin or poly(vinyl alcohol) but are preferably composed of poly(silicic acid) and a water-soluble hydroxyl-containing monomer or polymer as described in U.S. Pat. No. 4,741,992, issued May 3, 1988. Protective overcoats may also be provided in the form of pressure sensitive laminated films. Alternatively, two elements comprising thermally sensitive compositions coated on supports, at least one of which is transparent, may be laminated together to form a device comprising the thermally sensitive compositions sealed between the supports, or a single element comprising a transparent support may be folded and laminated to seal the thermally sensitive composition between the folded support.

Time and temperature integrating devices used in accordance with the invention which comprise photothermographic compositions may contain a removable pressure sensitive adhesive attached opaque overcoat, or otherwise be packaged in a light-impermeable enclosure, so as to prevent fogging of the light sensitive silver salt contained therein prior to use of the device. The device may then be simply activated by removal of the overcoat or enclosure and exposure to ambient light (or other activating means). While the photothermographic composition may still be somewhat sensitive to excessive thermal exposures even prior to being exposed to light, as the exposed silver halide acts as a catalyst, the device prior to exposure may be much more stable in storage.

Figure 5A:
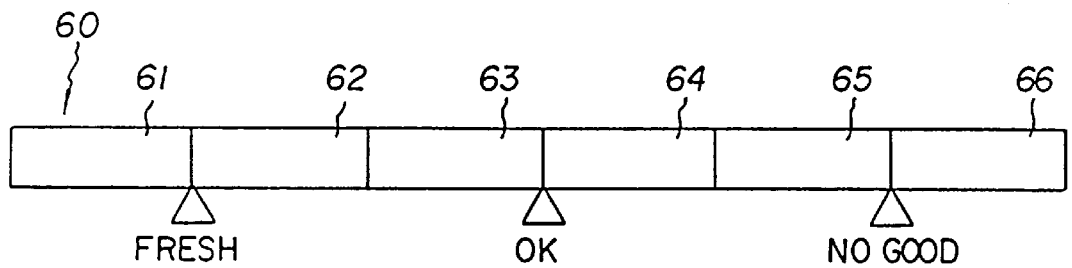
FIG. 5a represents an indicator device comprising areas of differing thermal sensitivity in "fresh" state, having been exposed to no "high temperature" exposure.
Figure 5B:
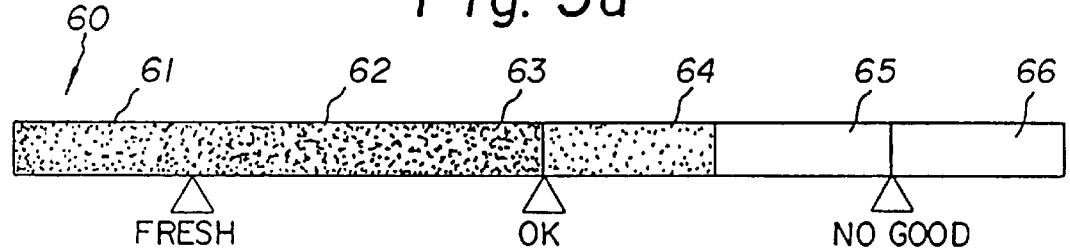
FIGS. 5b–5d represent the same device upon "high temperature" exposures for progressively extended periods of time.
Figure 5C:
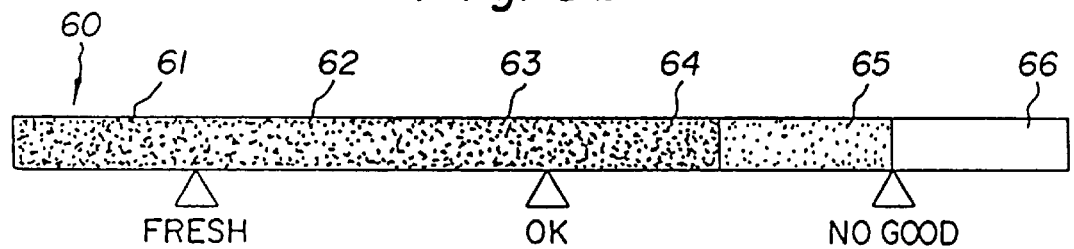
Figure 5D:
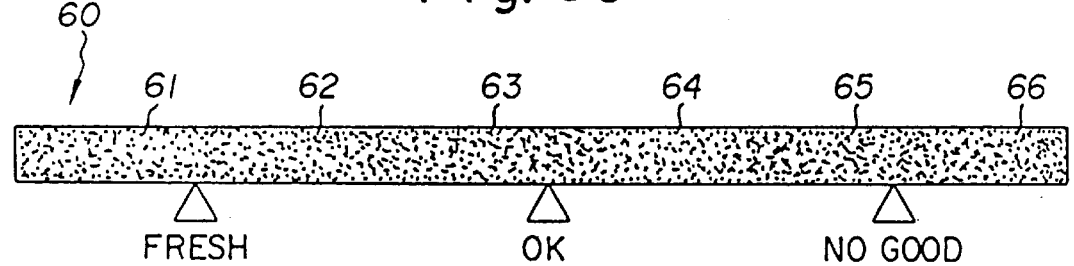

In accordance with a particular embodiment, time and temperature integrating devices may be used which are designed for providing a visually observable indication of various ranges of cumulative thermal exposure as disclosed in copending, commonly assigned, concurrently filed U.S. application Ser. No. 08/987,559 (Kodak Docket No. 76873), the entire disclosure of which is incorporated by reference herein. Devices in accordance with such embodiment comprise at least two thermally sensitive image-forming areas of differing thermal sensitivity along with indicating indicia in association with the thermally sensitive image forming areas for indicating when each image forming area of the device has been exposed to predetermined cumulative thermal exposures. The two thermally sensitive image-forming areas of different thermal sensitivity may be formed by pre-exposing one of the areas to a controlled level of thermal exposure so as to require less subsequent thermal exposure than at least one other thermally sensitive image-forming area of the device to form an image of the same density. For image-forming areas comprising photothermographic compositions, the areas may be preconditioned with differential light exposures to differentially pre-activate the compositions. Alternatively, the at least two thermally sensitive image forming areas of different thermal sensitivity may comprise different chemical formulations which exhibit different thermal sensitivities. As illustrated in FIGS. 5a–5d, the areas of differing thermal sensitivity may be aligned in an indicator device to form a band 60 which progressively changes from one color or density level to another along the length of the band with increasing thermal exposure. FIG. 5*a* represents a device comprising areas 61 through 66 of differing thermal sensitivity in "fresh" state, having been exposed to no "high temperature" exposure, while FIGS. 5*b*–5*d* represent the same device upon "high temperature" exposures for extended periods of time. Markers adjacent to the band may provide status information such as "FRESH", "OK", and "NO GOOD". This would allow a user to judge the cumulative amount of thermal exposure that a product has been exposed to relative to the quality of the product. Differential pre-heating along the strip may be achieved by contact with multiple temperature controlled heat sources that are set at incrementally decreasing temperatures and shaped and positioned to generate the appropriate pre-heat pattern. Linear array thermal printing heads which are conventionally used in fax machines and thermal dye sublimation printers may be programmed to generate fine heat differentials on the order of 300 different temperatures per inch. This technique would produce a cumulative thermal exposure indicator that would show very fine incremental changes in cumulative heat.

Co-pending, commonly assigned, concurrently filed U.S. patent application Ser. No. 08/987,662 (Kodak Docket No. 76870AJA) incorporated by reference above contains examples of elements comprising various thermally sensitive image-forming compositions coated on supports which may be particularly suitable for use in time and temperature integrating devices employed in accordance with the instant invention, as they may be designed to provide various differing rates of time-temperature dependent cumulative changes which may be desired to be monitored for various photographic films. Such example materials have total thicknesses of less than 150 micrometers, and may be used in combination with indicating indicia on a photographic film cartridge as more fully described above.

The invention has been described in detail, with particular reference to certain preferred embodiments thereof, but it should be understood that variations and modifications can be effected within the spirit and scope of the invention.

What is claimed is:

1. A photographic film cartridge comprising a housing with an outer surface, and a time and temperature integrating device for providing a visually observable indication of cumulative thermal exposure on the outer surface, wherein the time and temperature integrating device is thin enough so as to not interfere with performance of the cartridge in a photographic camera and comprises a thermally sensitive image-forming area and indicating indicia in association with the image-forming area for indicating when the film cartridge has been exposed to a predetermined cumulative thermal exposure.

2. A photographic film cartridge according to claim 1, wherein the thermally sensitive image-forming area of the time and temperature integrating device is positioned so as to be viewable through a film type window of a photographic camera when the cartridge is inserted into the photographic camera.

3. A photographic film cartridge according to claim 1, comprising a 35 mm photographic film cartridge.

4. A photographic film cartridge according to claim 1, comprising an Advanced Photo System film cartridge.

5. A photographic film cartridge according to claim 1, wherein the indicating indicia comprises letters or graphics which become obscured by an image formed by the thermally sensitive image-forming area when the cartridge has been exposed to a predetermined cumulative thermal exposure.

6. A photographic film cartridge according to claim 1, wherein the indicating indicia comprises a bar code.

7. A photographic film cartridge according to claim 1, wherein the time and temperature indicating device is less than 300 micrometers in total thickness.

8. A photographic film cartridge according to claim 1, wherein the thermally sensitive image-forming area comprises a combination of (i) an organic silver salt oxidizing agent and (ii) a reducing agent for the organic silver salt oxidizing agent.

9. A photographic film cartridge according to claim 8, wherein the time and temperature indicating device is less than 300 micrometers in total thickness.

10. A process for controlling the photofinishing of film contained in a photographic film cartridge comprising a housing with an outer surface, and a time and temperature integrating device for providing an indication of cumulative thermal exposure on the outer surface, said process comprising determining from the time and temperature integrating device whether the film has been exposed beyond a maximum level of cumulative thermal exposure, and rejecting the film for photofinishing if the thermal exposure level is beyond a maximum level.

11. A process according to claim 10, further comprising adjusting the photofinishing process to correct for optimum results based upon the level of cumulative thermal exposure when the level of thermal exposure is determined to be below the maximum level.

12. A process according to claim 10, wherein the time and temperature integrating device comprises a thermally sensitive image-forming area and indicating indicia in association with the image-forming area for indicating when the film cartridge has been exposed to a predetermined cumulative thermal exposure.

13. A photographic film cartridge according to claim 12, wherein the thermally sensitive image-forming area comprises a combination of (i) an organic silver salt oxidizing agent and (ii) a reducing agent for the organic silver salt oxidizing agent.

14. A process according to claim 12, wherein the indicating indicia comprises a bar code, and whether the film has been exposed beyond a maximum level of cumulative thermal exposure is determined by failure to be able to read the bar code with a bar code reader.

15. A process according to claim 10, wherein the photographic film cartridge comprises a 35 mm photographic film cartridge.

16. A process according to claim 10, wherein the photographic film cartridge comprises an Advanced Photo System film cartridge.

* * * * *